(12) United States Patent
Hancock et al.

(10) Patent No.: US 10,024,249 B2
(45) Date of Patent: Jul. 17, 2018

(54) MOTOR VEHICLE CONTROLLER AND METHOD OF CONTROLLING A MOTOR VEHICLE

(71) Applicant: JAGUAR LAND ROVER LIMITED, Warwickshire (GB)

(72) Inventors: Matthew Hancock, Coventry (GB); Guy Robinson, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 179 days.

(21) Appl. No.: 14/375,214

(22) PCT Filed: Jan. 30, 2013

(86) PCT No.: PCT/IB2013/050791
§ 371 (c)(1),
(2) Date: Jul. 29, 2014

(87) PCT Pub. No.: WO2013/114298
PCT Pub. Date: Aug. 8, 2013

(65) Prior Publication Data
US 2014/0372014 A1    Dec. 18, 2014

(30) Foreign Application Priority Data

Jan. 30, 2012  (GB) .................................. 1201532.7

(51) Int. Cl.
*F02D 17/04* (2006.01)
*F02D 41/04* (2006.01)
(Continued)

(52) U.S. Cl.
CPC ....... *F02D 35/02* (2013.01); *B60W 30/18018* (2013.01); *F02D 17/04* (2013.01);
(Continued)

(58) Field of Classification Search
CPC ....... Y02T 10/48; F02D 41/042; F02D 35/02; F02D 17/04; F02D 29/02; F02N 11/0814;
(Continued)

(56) References Cited

U.S. PATENT DOCUMENTS

| 4,192,279 A | 3/1980 | Maisch et al. |
| 4,574,752 A | 3/1986 | Reichert, Jr. et al. |

(Continued)

FOREIGN PATENT DOCUMENTS

| EP | 1939059 A2 | 7/2008 |
| EP | 2036793 A2 | 3/2009 |

(Continued)

OTHER PUBLICATIONS

International Search Report for International Application No. PCT/IB2013/050791 dated Jun. 21, 2013.

(Continued)

*Primary Examiner* — Sizo Vilakazi
(74) *Attorney, Agent, or Firm* — Carlson, Gaskey & Olds

(57) ABSTRACT

Embodiments of the invention relate to a motor vehicle controller operable automatically to stop and subsequently to restart an engine of a vehicle according to a prescribed control methodology. The controller is operable automatically to adjust an engine stop delay parameter in dependence on the value of at least one vehicle endurance parameter. The engine stop delay parameter corresponds to a period for which the engine of the vehicle remains switched on when it is determined that a condition exists allowing the engine to be switched off during the course of a drive cycle. The value of the endurance parameter is responsive to stop/start operations being performed during the course of a drive cycle. The controller is operable to adjust the engine stop delay parameter to prevent the value of the endurance (Continued)

parameter exceeding a prescribed maximum endurance value before a prescribed time period elapses.

16 Claims, 3 Drawing Sheets

(51) Int. Cl.
*F02N 11/08* (2006.01)
*F02D 35/02* (2006.01)
*F02D 29/02* (2006.01)
*B60W 30/18* (2012.01)
*B60K 6/48* (2007.10)

(52) U.S. Cl.
CPC .......... *F02D 29/02* (2013.01); *F02N 11/0833* (2013.01); *B60K 2006/4825* (2013.01); *F02N 2200/14* (2013.01); *F02N 2300/2011* (2013.01); *Y02T 10/48* (2013.01); *Y02T 10/6252* (2013.01)

(58) Field of Classification Search
CPC ............. F02N 11/0844; F02N 11/0818; F02N 2019/008; F02N 11/0833
USPC ...................................... 123/179.4
See application file for complete search history.

(56) References Cited

U.S. PATENT DOCUMENTS

| | | | |
|---|---|---|---|
| 5,222,469 A | 6/1993 | Sutton | |
| 6,019,183 A | 2/2000 | Shimasaki et al. | |
| 6,283,086 B1* | 9/2001 | Yamamoto | B60K 6/543 123/179.4 |
| 7,481,194 B2* | 1/2009 | Celisse | F02N 11/006 123/179.4 |
| 8,660,775 B2* | 2/2014 | Baumann | F02N 11/0814 123/179.4 |
| 2007/0124037 A1 | 5/2007 | Moran | |
| 2008/0167765 A1 | 7/2008 | Medema et al. | |
| 2008/0294329 A1* | 11/2008 | Noda | F01N 9/002 701/112 |
| 2010/0152995 A1* | 6/2010 | Baumann | F02N 11/0814 701/112 |
| 2012/0109469 A1 | 5/2012 | Pebley et al. | |
| 2013/0124066 A1 | 5/2013 | Pebley et al. | |
| 2013/0345952 A1* | 12/2013 | Tsumori | F02D 29/02 701/113 |

FOREIGN PATENT DOCUMENTS

| | | |
|---|---|---|
| FR | 2923909 A1 | 5/2009 |
| JP | 2005329787 A | 12/2005 |
| WO | 2011048338 A1 | 4/2011 |

OTHER PUBLICATIONS

Combined Search and Examination Report for Application No. GB1201532.7 dated May 30, 2012.

* cited by examiner

MOTOR VEHICLE CONTROLLER AND METHOD OF CONTROLLING A MOTOR VEHICLE

FIELD OF THE INVENTION

The present invention relates to controllers for a motor vehicle and to a method of controlling a motor vehicle.

BACKGROUND

It is known to provide a motor vehicle having a controller operable to control the motor vehicle to perform one or more functions. For example, in a vehicle having stop/start functionality the controller is operable to stop an engine of the vehicle when the vehicle is stationary for more than a prescribed period of time, such as when stopped at a traffic light. The controller restarts the engine when the driver releases a brake of the vehicle.

It is to be understood that components associated with the vehicle are rated to endure a prescribed number of stop/start cycles before reaching an endurance limit of the components. Some vehicles such as taxis may be subject to a substantial amount of urban driving where stops are made frequently during the course of a journey and many journeys are made each day. The endurance limit of one or more components may therefore be reached sooner than in the case of a vehicle subject to normal domestic consumer use and not operated under commercial or even abuse conditions.

It is against this background that the present invention has been conceived. Embodiments of the invention may provide a motor vehicle controller which addresses or obviates the above problem. Other aims and advantages of the invention will become apparent from the following description, claims and drawings.

STATEMENT OF THE INVENTION

Aspects of the invention provide a controller, a method and a vehicle as claimed in the appended claims.

According to another aspect of the invention, there is provided a motor vehicle controller operable automatically to stop and subsequently to restart an engine of a vehicle according to a prescribed control methodology, wherein the controller is operable automatically to adjust an engine stop delay parameter in dependence on the value of at least one vehicle endurance parameter, the engine stop delay parameter corresponding to a period for which the engine of the vehicle remains switched on when it is determined that a condition exists allowing the engine to be switched off during the course of a drive cycle, and the value of the endurance parameter being responsive to stop/start operations being performed during the course of a drive cycle;

wherein the controller is operable to adjust the engine stop delay parameter to prevent the value of the endurance parameter exceeding a prescribed maximum endurance value before a prescribed time period elapses.

Embodiments of the invention have the advantage that a method of ensuring that a vehicle meets a given requirement in respect of a value of an endurance parameter is provided. The endurance requirement may be a legislative requirement such as an amount of emissions generated by the vehicle or a user requirement such as an expected lifetime of a vehicle or one or more components thereof.

It is to be understood that in some embodiments adjusting the value of the engine stop delay parameter may be described as 'derating' one or more vehicle performance characteristics relative to an optimal performance characteristic of the vehicle. The optimal performance characteristic of the vehicle may for example be the performance obtained with the operating parameter remained at an original 'new vehicle' value before the value was adjusted.

The controller may be operable automatically to adjust the engine stop delay parameter when the value of the at least one vehicle endurance parameter exceeds a prescribed threshold value.

The controller may be operable automatically to adjust the engine stop delay parameter according to a closed loop feedback methodology so that the value of the endurance parameter tends towards the prescribed maximum value at the end of the prescribed time period.

The closed loop feedback methodology may be configured to implement a proportional-integral-differential (PID) control methodology.

Other closed loop control methodologies are also useful. Open loop control methodologies may also be useful, in some embodiments.

In some embodiments damage to engine components associated with engine starting such as a starting system ring gear, fuel rail or high pressure fuel pump may be mitigated. Component wear and fatigue during stop/start cycles may be exacerbated by deterioration of lubrication films such as fuel lubrication films in one or more components such as the fuel pump. Premature failure of these components can therefore occur, the time to failure being determined by the rate of accumulation of stop/start cycles performed by the vehicle. The rate of accumulation is dependent directly on a user's driving behaviour and usage patterns. Prolonged aggressive vehicle use and high variation in vehicle speed may cause the conditions required for an excessively high rate of start cycle accumulation.

The engine stop delay parameter may for example be a 'change of mind' delay parameter in a hybrid electric vehicle or a suitable non-hybrid stop/start vehicle wherein the engine remains switched on when a driver releases his foot from an accelerator pedal of the vehicle. Rather than switching the engine off immediately, in anticipation of a braking operation, the vehicle may keep the engine on for a prescribed period in case the driver suddenly re-depresses the accelerator pedal without braking. It is to be understood that in some arrangements, if the driver releases the accelerator pedal and depresses a brake pedal, the engine may be switched off immediately even if the change of mind delay period has not yet expired when the brake pedal is depressed.

Alternatively or in addition the engine stop delay parameter may be a 'vehicle stopped' engine stop delay parameter in a vehicle (which may be a hybrid vehicle or a non-hybrid vehicle with stop/start functionality) in which when the vehicle is stopped and the driver holds the vehicle stationary by means of a brake, the engine is switched off until the brake is released or an accelerator pedal depressed.

The at least one vehicle endurance parameter may correspond to the cumulative number of stop/start operations performed by a vehicle, the controller being operable to increase the engine stop delay parameter in order to prevent the value of the at least one vehicle endurance parameter exceeding the prescribed maximum value at the end of the prescribed time period.

The controller may increase the engine stop delay parameter if the value of the at least one endurance parameter is increasing at a rate wherein the prescribed maximum value is likely to be exceeded.

Alternatively, the at least one vehicle endurance parameter may correspond to an amount of one or more engine combustion products emitted by a vehicle.

Thus, the controller may be configured to control the vehicle to ensure that the maximum accrual value of the amount of the one or more engine combustion products does not exceed a prescribed value at the end of the prescribed time period.

The at least one vehicle endurance parameter may correspond to the amount of the given one or more combustion products processed by an engine after-treatment apparatus and the maximum endurance value corresponds to the maximum cumulative amount of the given one or more combustion products that may be processed by an after-treatment apparatus.

This feature has the advantage that the controller may ensure that at the end of the prescribed time period an after-treatment apparatus has not been subject to an amount of the one or more combustion products that exceeds the prescribed maximum endurance value.

The at least one vehicle endurance parameter may correspond to the amount of a given one or more combustion products generated by an engine over a prescribed drive cycle.

The prescribed drive cycle may be a homologated drive cycle such as a European homologated NEDC (New European Driving Cycle) drive cycle. Alternatively, the prescribed drive cycle may be a different drive cycle.

In a further aspect of the invention there is provided a vehicle comprising a controller according to the first aspect, the vehicle being configured to be controlled by the controller.

Advantageously, the vehicle may comprise a hybrid electric vehicle.

Optionally, the vehicle is a conventional (non-hybrid) vehicle.

According to another aspect, the present invention provides a hybrid electric vehicle controller operable to control propulsion of a hybrid vehicle by a combustion engine or by electrically powered means or by both, the controller being operable automatically to activate and/or deactivate the combustion engine during the course of a drive cycle according to a prescribed control methodology, wherein the controller is operable to change the activation state of the combustion engine in dependence on the value of at least one vehicle endurance parameter, the value of the at least one vehicle endurance parameter being responsive to the activation state of the combustion engine, thereby to prevent the value of the endurance parameter exceeding a prescribed maximum endurance value before a prescribed time period elapses.

Thus, embodiments of the invention advantageously enable the combustion engine of a hybrid electric vehicle to be used in preference to electrically powered propulsion means or vice versa, so as to prolong the life of vehicle components, e.g. excessive wear of the combustion engine may be mitigated by increasing the amount of time for which the engine is deactivated during a drive cycle, or the battery life of a battery used to power the electrically powered means may be prolonged by increasing the amount of time for which the engine is activated. The electrically powered means may be any suitable electrical machine, such as an electric motor, or a crankshaft integrated motor/generator (CIMG).

The controller may be operable automatically to adjust the activation state of the combustion engine when the value of the at least one vehicle endurance parameter exceeds a prescribed threshold value.

The controller may be operable automatically to adjust the activation state of the combustion engine according to a closed loop feedback methodology so that the value of the endurance parameter tends towards the prescribed maximum value at the end of the prescribed time period.

The closed loop feedback methodology may be configured to implement a proportional-integral-differential (PID) control methodology.

The at least one vehicle endurance parameter may be associated with the combustion engine, and the controller is operable to reduce the amount of time the engine is running during the course of a drive cycle so as to prolong the life of the combustion engine.

The at least one vehicle parameter may be associated with the electrically powered means and the controller is operable to increase the amount of time the engine is running during the course of the drive cycle so as to prolong the life of the electrically powered means.

The at least one vehicle endurance parameter may be associated with a battery for powering the electrically powered means and the controller is operable to increase the amount of time the engine is running during the course of the drive cycle so as to prolong the life of the battery.

In a further aspect of the invention, there is provided a hybrid electric vehicle comprising a controller according to the previously described aspect the vehicle being configured to be controlled by the controller.

In a still further aspect, the present invention provides a method of controlling a motor vehicle comprising automatically stopping and subsequently restarting an engine of the vehicle according to a prescribed control methodology, the method comprising;

adjusting an engine stop delay parameter in dependence on the value of at least one vehicle endurance parameter, the engine stop delay parameter corresponding to a period for which the engine of the vehicle remains switched on when it is determined that a condition exists allowing the engine to be switched off during the course of a drive cycle, and the value of the endurance parameter being responsive to stop/start operations being performed during the course of a drive cycle; and adjusting the engine stop delay parameter to prevent the value of the endurance parameter exceeding a prescribed maximum endurance value before a prescribed time period elapses.

In yet another aspect, the present invention provides a method of controlling propulsion of a hybrid electric vehicle by a combustion engine or by electrically powered means or by both, the method comprising automatically activating and/or deactivating the combustion engine during the course of a drive cycle according to a prescribed control methodology; and changing the activation state of the combustion engine in dependence on the value of at least one vehicle endurance parameter, the value of the at least one vehicle endurance parameter being responsive to the activation state of the combustion engine, thereby to prevent the value of the endurance parameter exceeding a prescribed maximum endurance value before a prescribed time period elapses.

According to another aspect of the invention there is provided a motor vehicle controller operable to control a vehicle to perform a prescribed operation when required according to a prescribed control methodology, wherein the controller is operable automatically to adjust at least one operating parameter associated with the prescribed operation responsive to a value of at least one vehicle endurance parameter, the endurance parameter being responsive to the value of the operating parameter, thereby to prevent the value of the endurance parameter exceeding a prescribed maximum endurance value before a prescribed time period elapses.

In a still further aspect of the invention there is provided a method of controlling a vehicle comprising performing a required operation when required according to a prescribed control methodology, the method comprising adjusting at least one operating parameter associated with the prescribed operation responsive to a value of at least one vehicle endurance parameter, the endurance parameter being responsive to the value of the operating parameter, thereby to prevent the value of the endurance parameter exceeding a prescribed maximum endurance value before a prescribed time period elapses.

In another aspect of the invention there is provided a motor vehicle controller operable to control the vehicle to perform a prescribed operation, the operation having an operation limit associated therewith corresponding to a number of times the operation may be performed before a cycle limit of one or more components of the vehicle is reached, the controller being operable to perform the operation when required according to a prescribed control methodology, wherein if the number of operations performed by the vehicle over a prescribed period exceeds a reference value the controller is operable to adjust the control methodology to reduce a frequency with which the operation is performed thereby to ensure that the operation limit is not exceeded before an endurance limit of the vehicle is reached.

In yet another aspect of the invention there is provided a motor vehicle controller operable to control the vehicle to perform a prescribed operation, the operation having an operation limit associated therewith corresponding to a number of times the operation may be performed before a cycle limit of one or more components of the vehicle is reached, the controller being operable to perform the operation when required according to a prescribed control methodology, wherein if the number of operations performed by the vehicle over a prescribed period exceeds a reference value the controller is operable to adjust the control methodology to reduce a frequency with which the operation is performed.

In some embodiments, the controller is arranged to control the vehicle to prevent the cumulative value of the endurance parameter exceeding a prescribed maximum accrual value before the end of a prescribed distance travelled by the vehicle rather than a prescribed time period.

In an further aspect of the invention there is provided a motor vehicle controller operable to control the vehicle to perform a prescribed operation when required according to a prescribed control methodology, wherein the controller is operable automatically to adjust at least one operating parameter associated with the prescribed operation responsive to a cumulative value of at least one vehicle endurance parameter, the endurance parameter being responsive to the value of the operating parameter, thereby to prevent the cumulative value of the endurance parameter exceeding a prescribed maximum accrual value before the end of a prescribed time period.

Within the scope of this application it is envisaged that the various aspects, embodiments, examples and alternatives, and in particular the features thereof, set out in the preceding paragraphs, in the claims and/or in the following description and drawings, may be taken independently or in any combination thereof. For example, features described in connection with one embodiment are applicable to all embodiments, unless such features are incompatible.

BRIEF DESCRIPTION OF THE DRAWINGS

Embodiments of the invention will now be described, by way of example only, with reference to the accompanying figures in which.

DETAILED DESCRIPTION

Figure 1:
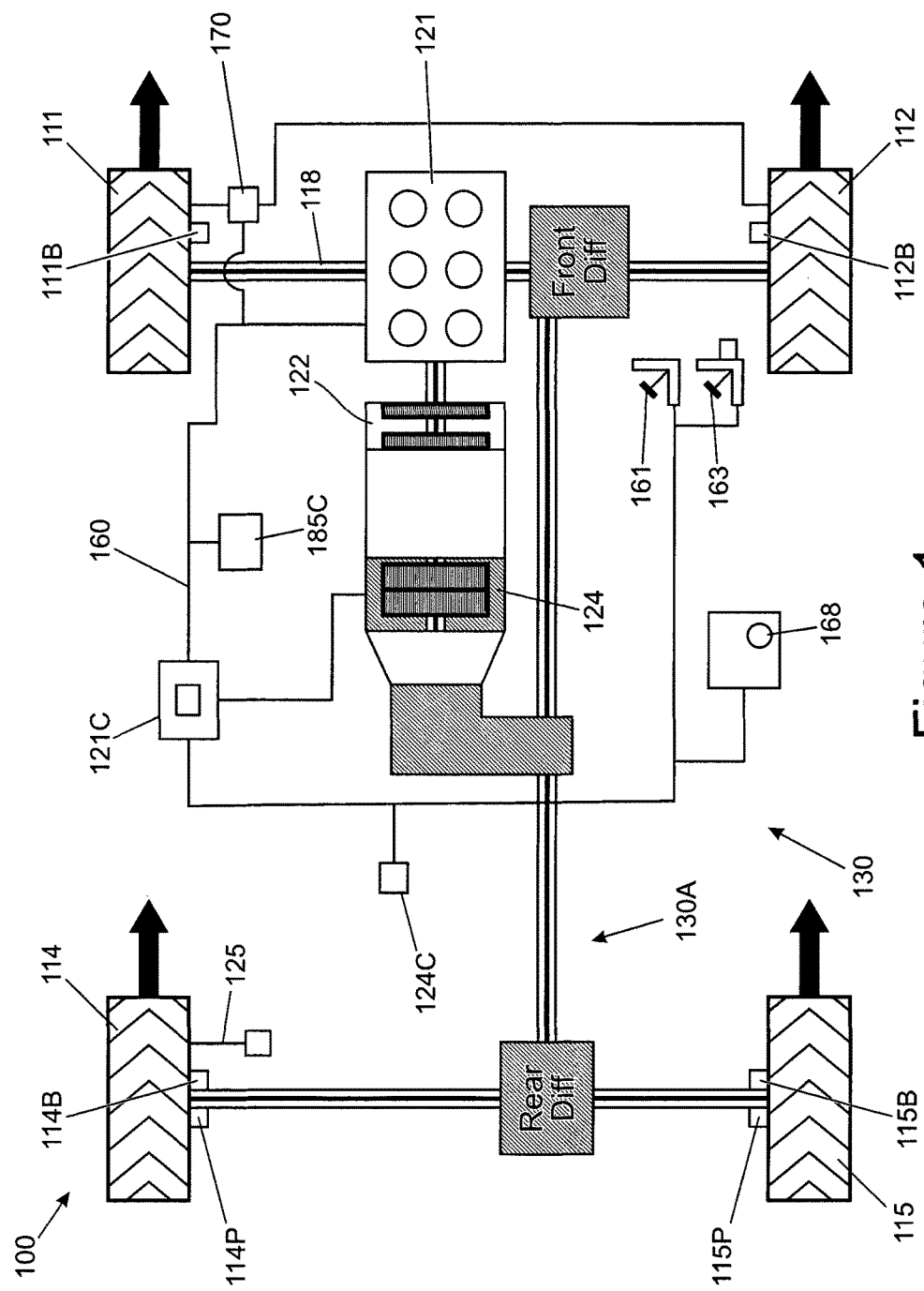
FIG. 1 is a schematic illustration of a motor vehicle according to an embodiment of the present invention.

FIG. 1 shows a stop/start vehicle 100 according to an embodiment of the invention having an internal combustion engine 121, an automatic transmission 124 and a set of four wheels 111, 112, 114, 115. The transmission 124 may be coupled to rear wheels 114, 115 only or to both front and rear wheels 111, 112, 114, 115 by means of a driveline 130A.

Each of the wheels has a respective disc brake 111B, 112B, 114B, 115B operable by means of a driver operated brake pedal 161 to decelerate the vehicle when the vehicle is moving. Rear wheels 114, 115 of the vehicle are also provided with a respective driver operated parking brake 114P, 115P each in the form of a drum brake. The parking brakes 114P, 115P are operable to be applied and released by means of a driver-operated parking brake actuator 168 in the form of a push-button actuator.

The vehicle 100 has an engine controller 121C, a brake controller 170, a transmission controller 124C and a body controller 185C. The controllers 121C, 170, 124C, 185C are arranged to communicate with one another by means of a controller area network (CAN) bus 160.

The engine 121 is operable to be started and stopped by means of the engine controller 121C. The engine controller 121C is arranged to implement a stop/start scheduler functionality whereby the controller 121C determines when the engine 121 should be stopped according to a stop/start control methodology. When it is determined that the engine 121 should be stopped the stop/start scheduler commands the engine controller 121C to stop the engine 121.

The controller 121C is configured to command the engine to be stopped when the vehicle is held stationary by means of the brake pedal 161. When it is determined by the controller 121C that this condition exists, the controller 121C waits for an engine stop delay period $T_{ed}$ to expire and then turns off the engine 121. If during the engine stop delay period the brake pedal 161 is released or an accelerator pedal 163 is depressed, the controller 121C does not turn the engine 121 off when the delay period expires.

The purpose of the engine stop delay period is to reduce a risk that the engine 121 is switched off when the vehicle has made a brief stop before being driven again. This reduces a risk of mode chattering, i.e. a condition in which the engine 121 is switched off and back on in rapid succession.

If the engine stop delay period expires without the brake pedal 161 being released or the accelerator pedal 163 depressed, the engine 121 is switched off.

If it is determined that the engine 121 should be restarted, the stop/start scheduler commands the engine controller 121C to restart the engine 121. It is to be understood that in the present embodiment stopping of the engine 121 is only performed when the vehicle 100 is held stationary (or almost stationary) by means of the brake pedal 161. In some alternative embodiments stopping of the engine 121 may be performed whilst the vehicle 100 is moving. For example in some embodiments having electrically powered power steering and brake actuators stopping of the engine 121 may be performed whilst the vehicle 100 is moving. Furthermore, in suitably configured hybrid electric vehicles such as that of FIG. 3 (see below) stopping of the engine may also be performed whilst the vehicle is moving.

The engine controller 121C is configured to implement an endurance limit control methodology. According to the endurance limit control methodology the controller 121C controls the value of the engine stop delay period to reduce a risk that the number of times N that the engine 121 is started during the course of a prescribed design life time period $T_{EOL}$ exceeds a prescribed endurance or accrual limit value $N_{MAX}$.

The accrual limit value $N_{MAX}$ corresponds to the maximum number of engine starts that one or more components of the vehicle such as a fuel pump, ring gear or starter motor are designed to accommodate over the design life time period $T_{EOL}$. The accrual limit value may correspond to the maximum number of times any one of these components is designed to accommodate an engine start operation. In some embodiments the accrual limit corresponds to the maximum number of times the component accommodating the lowest number of start operations can accommodate a start operation. Other arrangements are also useful.

The period $T_{EOL}$ may for example be a period of 3 years, a period of 10 years, a period of 15 years, or any other suitable period.

The controller 121C is configured to count the total (or cumulative) number of times N the engine 121C is started during the lifetime of the vehicle 100. In some embodiments the controller 121C is configured in addition or instead to count the total number of times the engine 121 is started following an automatic engine stop operation.

In one embodiment, the controller 121C compares the number of start operations N performed by the vehicle over a prescribed period with a reference value $N_{REF}$ for that period. The period may be the period since the vehicle was manufactured or first sold, or any other suitable period. For example, a period since a particular component or group of two or more components was serviced or replaced. Other arrangements are also useful.

If the number of operations N exceeds the reference value the controller 121C is configured to increase the engine stop delay period. This has the effect of reducing the rate of increase of the total number of engine start operations performed by the vehicle 100, since the likelihood that a driver over-rides engine stopping by releasing the brake pedal 161 and/or depressing the accelerator pedal 163 before the engine is stopped automatically is increased. In the present embodiment the reference value $N_{REF}$ is the value of N at any given time according to a linear increase in N as a function of time from N=0 at time T=0 to N=$N_{MAX}$ at the end of a vehicle design life, $T_{EOL}$, as illustrated in FIG. 2 (plot A).

Figure 2:
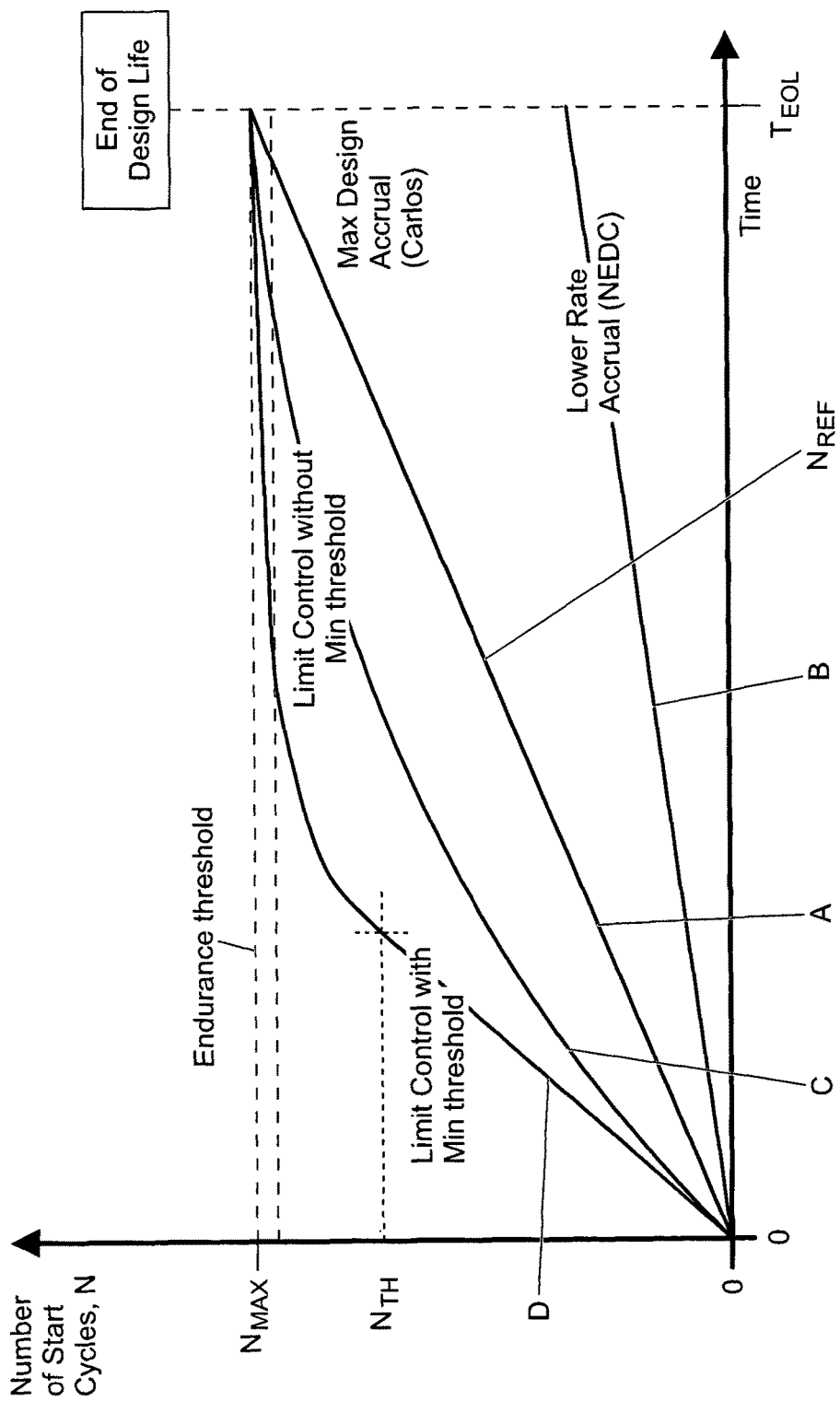
FIG. 2 is a plot of the cumulative number of stop/start cycles N performed by different vehicles as a function of time T up to a maximum accrual value $N_{MAX}$ at the end of a design life $T_{EOL}$ of a component of the vehicle.

FIG. 2 is a plot of total number of start cycles accrued as a function of time for four vehicles operated in different respective ways. The accrual limit value $N_{MAX}$ is indicated by the upper dotted line on the trace.

In some arrangements the controller 121C implements a proportional-integral-differential (PID) closed loop feedback control methodology in order to determine a required value of the engine stop delay period in order to manage the increase in the value of the total number of engine start operations. As noted above, the controller 121C manages the increase so that the value does not exceed the accrual limit value $N_{MAX}$ before the prescribed design life time period $T_{EOL}$ has expired.

As noted above plot A of FIG. 2 corresponds to a linear rate of increase of the cumulative number of start cycles for a vehicle from zero at initial vehicle manufacture (time t=0) to $N_{MAX}$ after a period $T_{EOL}$ being the end of the design life of the vehicle. This plot corresponds to a maximum design usage rate in that the vehicle is designed to provide reliable stop/start functionality throughout the design life of the vehicle when subject to a rate of increase of N according to plot A.

Plot B corresponds to a vehicle subject to usage according to the New European Driving Cycle (NEDC) drive cycle. It can be seen that when the design life has expired the vehicle is still capable of performing a significant number of start cycles in a reliable manner.

Plots C and D correspond to relatively heavy usage in that the rate of accumulation of start cycles from time t=0 is above the maximum design usage rate of trace A. At the start of vehicle life, before controller intervention, the usage rate according to plots C and D is such that the accrual limit value of the number of start cycles, $N_{MAX}$, will be reached before the period $T_{EOL}$ expires unless controller intervention occurs.

In order to reduce a risk that $N_{MAX}$ is reached before the period $T_{EOL}$ expires, in one embodiment the controller 121C is configured to increase the value of the engine stop delay period if the value of N at a given moment in time exceeds a corresponding value of N according to linear trace A.

The value of N as a function of time for one vehicle configured according to this embodiment is illustrated by trace C of FIG. 2. It can be seen that N increases asymptotically as a function of time towards $N_{MAX}$ such that N approaches $N_{MAX}$ as time T approaches $T_{EOL}$.

In the case of a vehicle configured according to trace D, the controller 121C is configured not to adjust the engine stop delay period until a prescribed threshold number of cycles $N_{TH}$ have accrued, i.e. before N exceeds $N_{TH}$. Once N exceeds $N_{TH}$ the controller 121C begins to increase the engine stop delay period to reduce the rate of increase of N so that N approaches $N_{MAX}$ as T approaches $T_{EOL}$. As noted above, the controller 121C is arranged to control the vehicle 100 such that N does not exceed $N_{MAX}$ until T exceeds $T_{EOL}$.

Embodiments of the invention have the advantage that a risk that a driver is inconvenienced by failure of a component before the design life $T_{EOL}$ expires due to excessive demand placed on the component is reduced.

It is to be understood that a distinction may be made between 'basic' features of a vehicle that are vital if the vehicle is to perform essential functionality (such as engine starting at the start of a drive cycle) and more advanced features and functions such as convenience aids and economy or emissions palliatives such as engine stop/start functionality. Thus in some embodiments, in order to preserve engine start functionality at the start of future journeys to be made, engine stop/start functionality during the course of a drive cycle may be de-rated or even suspended in some arrangements, so as to reduce component wear.

In some embodiments, the controller 121C is configured to set one or more flags in a memory (either of the controller 121C or another portion of the vehicle 100) to indicate whether the engine stop delay period has been being increased by the controller 121C responsive to the value of N. This feature allows service personnel to identify a vehicle that has been subject to excessive use or abuse loads in terms of the number of start cycles performed by the vehicle, i.e. a vehicle that has been required to perform a higher than expected number of start cycles for its age (value of T).

This could indicate to service personnel (and/or a vehicle driver) that a particular type of service is required for the vehicle. In some embodiments the controller 121C may provide an indication that one or more components should be replaced as part of a preventive maintenance programme or that an alternative maintenance schedule or contract is more appropriate for the apparent use to which the vehicle is subject. This information may be useful in respect of vehicle service contracts or lease or hire contracts. In some arrangements this information may be useful in identifying a suitable vehicle battery contract since it may be determined in some embodiments whether or not a battery is subject to excessive use. By excessive use may be included, for example, use beyond that normally expected of a vehicle subject to average personal social and domestic use including commuting to and from a place of work.

In some alternative embodiments the controller 121C is arranged to control the engine stop delay period in order to reduce an amount of one or more combustion products generated by the vehicle 100. Thus if the rate of use of the vehicle 100 is such that the cumulative amount of one or more combustion products is greater than expected the controller 121C may be configured to decrease the engine stop delay period to reduce the amount of time for which the engine 121 is on during the course of a drive cycle.

This feature may be particularly advantageous in extending engine after-treatment apparatus lifetime. If the after-treatment apparatus is subject to abuse loading due to excessive vehicle usage, the after-treatment apparatus may become ineffective before the design life period $T_{EOL}$ expires. Thus embodiments of the invention implementing cumulative emissions management have the advantage that a risk that the after-treatment apparatus becomes ineffective before $T_{EOL}$ expires is reduced.

It is to be understood that in some embodiments the engine stop delay period may be reduced once the cumulative amount of the one or more combustion products emitted exceeds a threshold value.

The controller 121C may be configured to ensure that a rate of emission of one or more combustion products (such as CO2) does not increase by more than a prescribed amount above a reference rate over the course of the design life. Thus in some embodiments the controller 121C may be configured to ensure the rate of emission of the one or more combustion products does not increase by more than 10% above the reference rate, which may for example be a rate of emission over a reference drive cycle, such as the European homologation drive cycle NEDC noted above.

Other arrangements are also useful.

Figure 3:
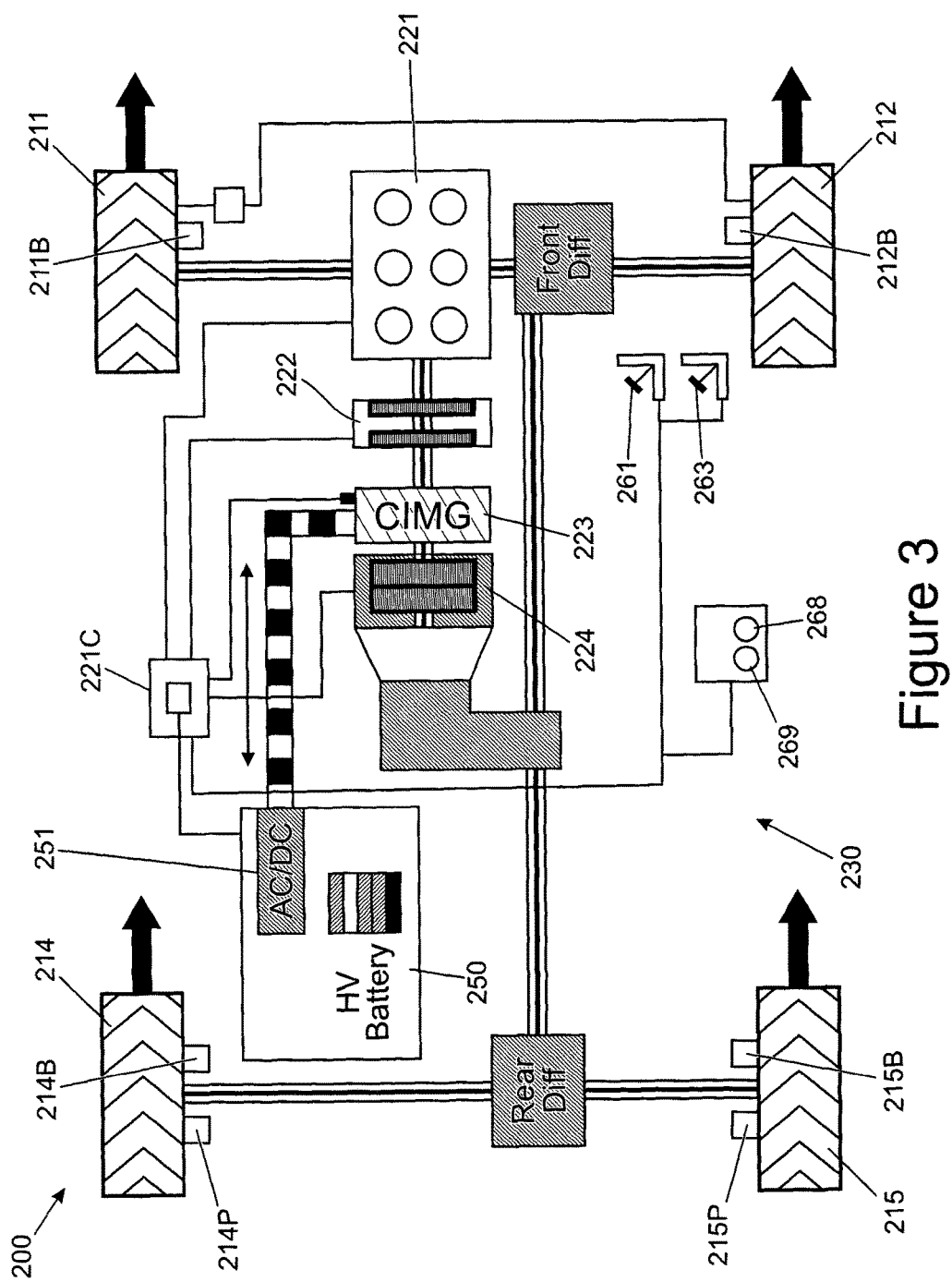
FIG. 3 is a schematic illustration of a hybrid electric motor vehicle according to an embodiment of the present invention.

FIG. 3 shows a hybrid electric vehicle 200 according to an embodiment of the present invention. The vehicle 200 has an internal combustion engine 221 releasably coupled to a crankshaft integrated motor/generator (CIMG) 223 by means of a clutch 222. The CIMG 223 is in turn coupled to an automatic transmission 224. The vehicle 200 is operable to provide drive torque to the transmission 224 by means of the engine 221 alone, the CIMG 223 alone or the engine 221 and CIMG 223 in parallel.

It is to be understood that in some embodiments the transmission 224 may be a manual transmission instead of an automatic transmission. The transmission may comprise a manual gearbox, a continually variable transmission or any other suitable transmission.

The transmission 224 is connected to a driveline 230 arranged to drive a pair of front wheels 211, 212 and a pair of rear wheels 214, 215. Other arrangements in which the driveline 230 is operable to drive front or rear wheels only are also useful.

The vehicle 200 has a battery 250 connected to an inverter 251 that generates a three-phase electrical supply that is supplied to the CIMG 223 when the CIMG 223 is operated as a motor. The battery 250 is arranged to receive charge from the CIMG 223 when the CIMG 223 is operated as a generator.

The vehicle 200 is configured to operate in either one of a hybrid electric vehicle (HEV) mode, a HEV inhibit mode and a selectable electric vehicle only (EV-only) mode according to the state of a HEV mode selector 269.

In the HEV mode of operation the vehicle 200 is arranged to operate either in a 'parallel' mode with the engine 221 and CIMG 223 both connected to the transmission 224 (i.e. clutch 222 is closed) or in a vehicle-selected EV mode. In the vehicle-selected EV mode (and in the driver selected EV-only mode) the clutch 222 is opened and the engine 221 is switched off.

When the vehicle 200 is in the HEV mode the vehicle 200 is configured automatically to determine whether to operate with the engine 221 switched on or off. When in HEV mode and the vehicle has selected automatically to switch the engine 221 off (and operate in the vehicle-selected EV mode), restarting of the engine 221 is controlled according to a value of driver demanded torque and a state of charge (SoC) of the battery 250 although other arrangements are also useful.

If the driver selects operation of the vehicle 200 in EV-only mode and the engine 221 is running, the vehicle 200 is configured to open the clutch 222 and to switch off the engine 221. Again, the CIMG 223 is then operated either as a motor or as a generator. It is to be understood that the CIMG 223 may be arranged to act as a generator in the EV-only mode in order to effect regenerative braking of the vehicle 200.

The vehicle 200 has a controller 221C arranged to control the vehicle 200 to switch the engine 221 on and off when in HEV mode according to an energy management strategy.

It is to be understood that a charge storage capacity of the battery 250 may deteriorate during the course of a life of the vehicle 200 due to repeated charge and discharge cycles. An amount of electrical energy required to increase the battery state of charge by a given amount may also increase due to deterioration of one of more components of the battery 250 or other components of the vehicle 200. These effects may cause the controller 221C to require the engine 221 to remain switched on for longer periods of time in order to recharge the battery 250, increasing the amount of a given combustion product emitted by the vehicle 200.

In order to mitigate this effect, the controller 221C is configured to reduce the engine stop delay period when it is determined that the engine 221 may be switched off. This has the effect of reducing an overall time period for which the engine 221 is switched on and therefore generating combustion products during the course of a given drive cycle.

It is to be understood that some embodiments of the invention have the advantage that a risk that a driver of a vehicle is inconvenienced by a component failure is reduced. This is because when a controller of the vehicle determines that a rate of accrual of the number of operations N performed by the vehicle may exceed the accrual limit before a prescribed period has expired, the controller may change a parameter associated with the operation in order to reduce the rate of accrual.

Some embodiments have the advantage that a risk that a rate of emission of one or more engine combustion products exceeds a prescribed level during a design life of the vehicle may be reduced. The rate of emission may increase for example due to an increased demand for charge by a battery of a vehicle in the case of a hybrid vehicle due to ageing of the battery as discussed above. In some embodiments the increase in rate of emission may be mitigated at least in part by reducing an engine stop delay period associated with the operation. In addition, in the case of a hybrid or non-hybrid vehicle an increase in rate of emission may occur for example due to ageing of one or more components of the vehicle. For example wear of one or more engine components may result in a decrease in efficiency of the engine. Wear of one or more vehicle components such as bearings or gears may result in an increase in energy loss associated with vehicle operation.

In some embodiments the controller 221C may be configured to reduce an amount of time for which the engine 221 is switched off during the course of a drive cycle in order to reduce an amount of charging and discharging of the battery 250 so as to prolong battery life, for example in cases where the battery 250 is subject to an excessive number of charge and discharge cycles. This may be the case for example due to excessive operation in EV-only mode.

Alternatively the controller 221C may be arranged to reduce the amount of time for which the engine 221 is switched on and increase the amount of time for which the vehicle 200 is driven in EV-only mode so as to prolong a life of the engine 221. Thus in cases where the engine 221 is subject to excessive use the controller 221 may be configured to adjust one or more parameters associated with operation of the vehicle 200 in order to reduce the amount of time for which the engine 221 is switched on.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

Embodiments of the invention will also be understood with reference to the following numbered paragraphs;

1. A motor vehicle controller operable automatically to stop and subsequently to restart an engine of a vehicle according to a prescribed control methodology,
   wherein the controller is operable automatically to adjust an engine stop delay parameter in dependence on the value of at least one vehicle endurance parameter, the engine stop delay parameter corresponding to a period for which the engine of the vehicle remains switched on when it is determined that a condition exists allowing the engine to be switched off during the course of a drive cycle, and the value of the endurance parameter being responsive to stop/start operations being performed during the course of a drive cycle;
   wherein the controller is operable to adjust the engine stop delay parameter to prevent the value of the endurance parameter exceeding a prescribed maximum endurance value before a prescribed time period elapses.
2. A controller as set in paragraph 1 operable automatically to adjust the engine stop delay parameter when the value of the at least one vehicle endurance parameter exceeds a prescribed threshold value.
3. A controller as set out in paragraph 1 operable automatically to adjust the engine stop delay parameter according to a closed loop feedback methodology so that the value of the endurance parameter tends towards the prescribed maximum value at the end of the prescribed time period.
4. A controller as set out in paragraph 3 wherein the closed loop feedback methodology is configured to implement a proportional-integral-differential (PID) control methodology.
5. A controller as set out in any one of paragraphs 1 to 4, wherein the at least one vehicle endurance parameter corresponds to the cumulative number of stop/start operations performed by a vehicle, the controller being operable to increase the engine stop delay parameter in order to prevent the value of the at least one vehicle endurance parameter exceeding the prescribed maximum value at the end of the prescribed time period.
6. A controller as set out in any one of paragraphs 1 to 4 wherein the at least one vehicle endurance parameter corresponds to an amount of one or more engine combustion products emitted by a vehicle.
7. A controller as set out in paragraph 6 wherein the at least one vehicle endurance parameter corresponds to the amount of the given one or more combustion products processed by an engine after-treatment apparatus and the maximum endurance value corresponds to the maximum cumulative amount of the given one or more combustion products that may be processed by an after-treatment apparatus.
8. A controller as set out in paragraph 6 wherein the at least one vehicle endurance parameter corresponds to the amount of a given one or more combustion products generated by an engine over a prescribed drive cycle.
9. A controller as set out in any one of paragraphs 6 to 8 operable to reduce the engine stop delay parameter in order to prevent the cumulative value of the at least one vehicle endurance parameter exceeding the prescribed maximum endurance value at the end of the prescribed time period.
10. A vehicle comprising a controller as set out in any one of paragraphs 1 to 9 and configured to be controlled by the controller.
11. A vehicle as set out in paragraph 10 wherein the vehicle is a hybrid electric vehicle.
12. A vehicle as set out in paragraph 10 wherein the vehicle is a non-hybrid vehicle.

13. A hybrid electric vehicle controller operable to control propulsion of a hybrid vehicle by a combustion engine or by electrically powered means or by both, the controller being operable automatically to activate and/or deactivate the combustion engine during the course of a drive cycle according to a prescribed control methodology, wherein the controller is operable to change the activation state of the combustion engine in dependence on the value of at least one vehicle endurance parameter, the value of the at least one vehicle endurance parameter being responsive to the activation state of the combustion engine, thereby to prevent the value of the endurance parameter exceeding a prescribed maximum endurance value before a prescribed time period elapses.

14. A controller as set out in paragraph 13 operable automatically to adjust the activation state of the combustion engine when the value of the at least one vehicle endurance parameter exceeds a prescribed threshold value.

15. A controller as set out in paragraph 13 operable automatically to adjust the activation state of the combustion engine according to a closed loop feedback methodology so that the value of the endurance parameter tends towards the prescribed maximum value at the end of the prescribed time period.

16. A controller as set out in paragraph 15, wherein the closed loop feedback methodology is configured to implement a proportional-integral-differential (PID) control methodology.

17. A controller as set out in any one of paragraphs 13 to 16, wherein the at least one vehicle endurance parameter is associated with the combustion engine, and the controller is operable to reduce the amount of time the engine is running during the course of a drive cycle so as to prolong the life of the combustion engine.

18. A controller as set out in any one of paragraphs 13 to 16, wherein the at least one vehicle parameter is associated with the electrically powered means and the controller is operable to increase the amount of time the engine is running during the course of the drive cycle so as to prolong the life of the electrically powered means.

19. A controller as set out in any one of paragraphs 13 to 16, wherein the at least one vehicle endurance parameter is associated with a battery for powering the electrically powered means and the controller is operable to increase the amount of time the engine is running during the course of the drive cycle so as to prolong the life of the battery.

20. A hybrid electric vehicle comprising a controller as set out in any one of paragraphs 13 to 19 and configured to be controlled by the controller.

21. A method of controlling a motor vehicle comprising automatically stopping and subsequently restarting an engine of the vehicle according to a prescribed control methodology, the method comprising;

adjusting an engine stop delay parameter in dependence on the value of at least one vehicle endurance parameter, the engine stop delay parameter corresponding to a period for which the engine of the vehicle remains switched on when it is determined that a condition exists allowing the engine to be switched off during the course of a drive cycle, and the value of the endurance parameter being responsive to stop/start operations being performed during the course of a drive cycle; and adjusting the engine stop delay parameter to prevent the value of the endurance parameter exceeding a prescribed maximum endurance value before a prescribed time period elapses.

22. A method of controlling propulsion of a hybrid electric vehicle by a combustion engine or by electrically powered means or by both, the method comprising automatically activating and/or deactivating the combustion engine during the course of a drive cycle according to a prescribed control methodology; and changing the activation state of the combustion engine in dependence on the value of at least one vehicle endurance parameter, the value of the at least one vehicle endurance parameter being responsive to the activation state of the combustion engine, thereby to prevent the value of the endurance parameter exceeding a prescribed maximum endurance value before a prescribed time period elapses.

The invention claimed is:

1. A motor vehicle controller configured to automatically stop and subsequently to restart an engine of a vehicle according to a prescribed control methodology, wherein the controller is configured to automatically adjust an engine stop delay parameter in dependence on the value of one or more vehicle endurance parameters, wherein at least one of the vehicle endurance parameters is indicative of a number of stop/start operations performed by the vehicle, the engine stop delay parameter corresponding to a time period defining for how long the engine of the vehicle is to remain switched on from when it is determined that a condition exists allowing the engine to be switched off during the course of a drive cycle, and the value of the at least one vehicle endurance parameter being responsive to stop/start operations being performed during the course of a drive cycle;

wherein the controller is configured to reference a prescribed time period or distance; wherein the controller is configured to adjust the engine stop delay parameter time period to prevent the value of the at least one vehicle endurance parameter exceeding a prescribed maximum endurance value within the referenced prescribed time period or distance, and wherein the controller is configured to start the engine stop delay parameter time period from a first determination that the condition exists allowing the engine to be switched off, and to command the engine to be stopped upon expiry of the engine stop delay parameter time period, the expiry occurring while the condition exists allowing the engine to be switched off as determined by the first determination, and before the condition allowing the engine to be switched off as determined by the first determination ceases to exist.

2. A controller as claimed in claim 1 wherein the controller is configured to automatically adjust the engine stop delay parameter when the value of the at least one vehicle endurance parameter exceeds a prescribed threshold value.

3. A controller as claimed in claim 1 wherein the controller is configured to automatically adjust the engine stop delay parameter according to a closed loop feedback methodology so that the value of the at least one endurance parameter tends towards the prescribed maximum value at the end of the prescribed time period.

4. A controller as claimed in claim 3 wherein the closed loop feedback methodology is configured to implement a proportional-integral-differential (PID) control methodology.

5. A controller as claimed in claim 1 wherein the at least one vehicle endurance parameter corresponds to the cumulative number of stop/start operations performed by the vehicle, the controller being configured to increase the engine stop delay parameter in order to prevent the value of the at least one vehicle endurance parameter exceeding the prescribed maximum value at the end of the prescribed time period.

6. A motor vehicle controller configured to automatically stop and subsequently to restart an engine of a vehicle according to a prescribed control methodology,
wherein the controller is configured to automatically adjust an engine stop delay parameter in dependence on the value of one or more vehicle endurance parameters, wherein at least one of the vehicle endurance parameters corresponds to an amount of one or more engine combustion products emitted by a vehicle, the engine stop delay parameter corresponding to a time period defining for how long the engine of the vehicle is to remain switched on from when it is determined that a condition exists allowing the engine to be switched off during the course of a drive cycle, and the value of the at least one vehicle endurance parameter being responsive to stop/start operations being performed during the course of a drive cycle;
wherein the controller is configured to reference a prescribed time period or distance;
wherein the controller is configured to start the engine stop delay parameter time period from a determination that the condition exists allowing the engine to be switched off, and to adjust the engine stop delay parameter time period to prevent the value of the at least one vehicle endurance parameter exceeding a prescribed maximum endurance value within the referenced prescribed time period or distance, and
wherein the controller is configured to command the engine to be stopped upon expiry of the engine stop delay parameter time period, the expiry occurring while the condition exists allowing the engine to be switched off as determined by the first determination, and before the condition allowing the engine to be switched off as determined by the first determination ceases to exist.

7. A controller as claimed in claim 6 wherein the at least one vehicle endurance parameter corresponds to the amount of the given one or more combustion products processed by an engine after-treatment apparatus and the maximum endurance value corresponds to the maximum cumulative amount of the given one or more combustion products that may be processed by an after-treatment apparatus.

8. A controller as claimed in claim 6 wherein the at least one vehicle endurance parameter corresponds to the amount of a given one or more combustion products generated by an engine over a prescribed drive cycle.

9. A controller as claimed in claim 6 wherein the controller is configured to reduce the engine stop delay parameter in order to prevent the cumulative value of the at least one vehicle endurance parameter exceeding the prescribed maximum endurance value at the end of the prescribed time period.

10. A vehicle comprising a controller as claimed in claim 1.

11. A vehicle as claimed in claim 10 wherein the vehicle is a hybrid electric vehicle.

12. A vehicle as claimed in claim 10 wherein the vehicle is a non-hybrid vehicle.

13. A method of controlling a motor vehicle comprising automatically stopping and subsequently restarting an engine of the vehicle according to a prescribed control methodology, the method comprising;
adjusting an engine stop delay parameter in dependence on the value of one or more vehicle endurance parameters, wherein at least one of the vehicle endurance parameters is indicative of a number of stop/start operations performed by the vehicle since a first time, the engine stop delay parameter corresponding to a time period defining for how long the engine of the vehicle is to remain switched on from when it is determined that a condition exists allowing the engine to be switched off during the course of a drive cycle, and the value of the at least one vehicle endurance parameter being responsive to stop/start operations being performed during the course of a drive cycle;
referencing a prescribed time period or distance;
adjusting the engine stop delay parameter to prevent the value of the at least one vehicle endurance parameter exceeding a prescribed maximum endurance value before the referenced prescribed time period elapses or a prescribed distance is travelled since the first time;
starting the engine stop delay parameter time period from a determination that the condition exists allowing the engine to be switched off; and
commanding the engine to be stopped upon expiry of the engine stop delay parameter time period, the expiry occurring while the condition exists allowing the engine to be switched off as determined by the first determination, and before the condition allowing the engine to be switched off as determined by the first determination ceases to exist.

14. A controller as claimed in claim 1, wherein
the first determination that the condition exists comprises a determination of use of a brake pedal, non-use of an accelerator pedal, or a combination thereof, and wherein the condition as determined by the first determination ceases to exist upon the next non-use of the brake pedal following the detected use of the brake pedal, the next use of the accelerator pedal following the detected non-use of the accelerator pedal, or a combination thereof.

15. A controller as claimed in claim 1, wherein the at least one vehicle endurance parameter indicative of a number of stop/start operations performed by the vehicle is a number of times the engine has started.

16. A controller as claimed in claim 1, wherein the controller is configured to perform the adjustment of the engine stop delay parameter time period to increase the time period after the first determination that the condition exists allowing the engine to be switched off, wherein the controller is configured to start the adjusted engine stop delay parameter time period from a second determination, after the first determination, that the condition exists allowing the engine to be switched off, and to command the engine to be stopped upon expiry of the adjusted engine stop delay parameter time period, the expiry occurring while the condition exists allowing the engine to be switched off as determined by the second determination, and before the condition allowing the engine to be switched off as determined by the second determination ceases to exist.

* * * * *